(12) United States Patent
Hanna et al.

(10) Patent No.: US 7,982,595 B2
(45) Date of Patent: *Jul. 19, 2011

(54) NETWORK POLICY EVALUATION

(75) Inventors: Stephen R. Hanna, Bedford, MA (US); Roger Allen Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/541,775

(22) Filed: Aug. 14, 2009

(65) Prior Publication Data
US 2009/0313373 A1    Dec. 17, 2009

Related U.S. Application Data

(63) Continuation of application No. 11/422,109, filed on Jun. 5, 2006, now Pat. No. 7,592,906.

(51) Int. Cl.
*G08B 29/00* (2006.01)
(52) U.S. Cl. ........................ 340/506; 709/225
(58) Field of Classification Search .................. 340/506, 340/286.02; 434/236, 238, 235; 128/920, 128/923; 709/225, 200, 223, 229
See application file for complete search history.

(56) References Cited

U.S. PATENT DOCUMENTS

| 6,283,761 | B1 | 9/2001 | Joao |
| 6,484,261 | B1 | 11/2002 | Wiegel |
| 6,539,425 | B1 | 3/2003 | Stevens et al. |
| 6,678,248 | B1 | 1/2004 | Haddock et al. |
| 6,678,827 | B1 | 1/2004 | Rothermel et al. |
| 7,592,906 | B1 * | 9/2009 | Hanna et al. .................. 340/506 |
| 2006/0179472 | A1 | 8/2006 | Chang et al. |

OTHER PUBLICATIONS

Co-pending U.S. Appl. No. 11/422,109, filed Jun. 5, 2006; Stephen R. Hanna et al., entitled "Network Policy Evaluation".
"TCG Trusted Network Connect TNC Architecture for Interoperability" Specification Verison 1.1, Revision 2; May 1, 2006, 40 pages.
"TCG Trusted Network Connect TNC IF-IMV" Specification Verizon 1.1, Revision 5; May 1, 2006, 61 pages.
"TCG Trusted Network Connect TNC IF-IMC" Specification Verizon 1.1, Revision 5; May 1, 2006, 56 pages.

* cited by examiner

*Primary Examiner* — Anh V La
(74) *Attorney, Agent, or Firm* — Harrity & Harrity, LLP

(57) ABSTRACT

A device may include an interface to send policy information to an evaluation module, where the policy information is related to a group of policies, and receive a group of results from the evaluation module, where the group of results indicates whether the status of a source device complies with the croup of policies. The interface may send an instruction to a destination device configured to implement at least a subset of the policies with respect to the source device based on the instruction.

20 Claims, 9 Drawing Sheets

| | CLIENT ID 510 | CHECK 520 | POLICY 530 | SEM FORMAT 540 | RESULT 550 | IMPLEMENT 560 |
|---|---|---|---|---|---|---|
| ENTRY 502 | 215.123.1.1 | SIGN ON | ANTIVIRUS | POLICY NAME | FAIL | NO |
| ENTRY 504 | BILL LEE | SIGN ON; CHANGE | ANTIVIRUS; O/S; SECURITY | POLICY ID; CONTENTS | PASS; 80%; FULL COMP | YES |
| ENTRY 506 | RESEARCH 001 | SIGN ON; PERIODIC | HARDWARE; ANTIVIRUS; SECURITY | POLICY ID; CONTENTS | N/A; 4 OF 5; FULL COMP | YES |
| ENTRY 508 | FINANCE | SIGN ON; CHANGE; PERIODIC | ANTIVIRUS; SECURITY; SPECIAL | PLICY ID; CLIENT DATA | PASS; FULL COMP; 100% | YES |

| POLICY ID: ANTIVIRUS | |
|---|---|
| SUB-POLICY | SUB-POLICY RESULT |
| EMAIL | PASSED |
| OPERATING SYSTEM | 90% |
| FIREWALL | 3 OUT OF 5 |
| WEB BROWSER | FAILED |
| DATA FILES | 100% |

FIG. 6A

610 – POLICY ID; 620 – SUB-POLICY; 630 – SUB-POLICY RESULT

602

| SUB-POLICY ID: EMAIL | |
|---|---|
| PATCH ID | VERSION ID |
| SPAM PATCH | 6.1 |
| PORNOGRAPHY PATCH | 1.0 |
| EXE ATTACHMENT PATCH | 3.1 |
| URBAN LEGEND PATCH | 2.0 |

FIG. 6B

640 – SUB-POLICY ID; 650 – PATCH ID; 660 – VERSION ID

| | | |
|---|---|---|
| CLIENT ID: BILL SMITH | POLICY ID: ANTIVIRUS | |
| POLICY RESULT: FAILED | | |
| SUB-POLICY | SUB-POLICY RESULTS | |
| EMAIL | PASSED | |
| OPERATING SYSTEM | 90% | |
| FIREWALL | 3 OUT OF 5 | |
| WEB BROWSER | FAILED | |
| DATA FILES | DF_RESULT.TXT | |
| INSTRUCTIONS: WWW.AV-FIX.COM | | |

FIG. 7

NETWORK POLICY EVALUATION

RELATED APPLICATION

This application is a continuation of U.S. patent application Ser. No. 11/422,109, filed Jun. 5, 2006, which is incorporated herein by reference.

FIELD OF THE INVENTION

Implementations consistent with principles of the invention relate generally to computer and data communications and more particularly to techniques for implementing network policies.

BACKGROUND OF THE INVENTION

Modern data networks may allow a client device to access one or more resources on a network. In certain situations, a client device may attempt to access sensitive resources, such as resources on a corporate network. For example, a client device may attempt to access a file server containing corporate financial data, such as sales records for a company.

Operators of networks containing sensitive information may wish to restrict network access unless devices meet certain requirements. For example, a network operator may not want client devices accessing financial data unless the client devices are protected with antivirus software and are running personal firewall software. The network operator may wish to use a number of different network policies to control access to a number of different resources on a network. Implementing a number of network policies may cause network administration and network policy enforcement to become very complex. As a result, the network operator may not be able to implement a desired number of policies in the network. Failure to implement adequate network policies may allow a client device to access resources that the client device should not be able to access.

Network operators may benefit from techniques that allow network policies to be implemented efficiently.

SUMMARY OF THE INVENTION

In accordance with an implementation, a device is provided. The device may include an interface to send policy information to an evaluation module, where the policy information is related to a group of policies, and receive a group of results from the evaluation module, where the group of results indicates whether the status of a source device complies with the group of policies. The interface may send an instruction to a destination device configured to implement at least a subset of the policies with respect to the source device based on the instruction.

In accordance with another implementation, a network device is provided. The network device may include an interface to receive instructions related to network policies determined by a server with respect to a protected device, where the instructions are related to policy results produced by an evaluation module operating with the server. The interface may receive a message from an endpoint, where the message is intended for the protected device, and may forward the message to the protected device when the endpoint complies with at least a subset of the network policies.

In accordance with still another implementation, a module is provided. The module may include interface logic to receive information identifying a group of network policies related to the client device, and to send policy results to a host device, where the policy results are related to the client device. The module may include evaluation logic to process policy contents based on the information, and to produce the policy results based on the processing, where the policy results are used by the host device to implement the network policies with respect to a destination device when the client device attempts to communicate with the destination device.

In accordance with yet another implementation, a method is provided. The method may include sending policy information to a module, receiving policy results from the module, and sending an enforcement instruction to a network device, where the enforcement instruction causes the network device to allow the device to access a resource when the device complies with at least one of a group of policies that are related to the policy information.

In accordance with still another implementation, a device is provided. The device may include a module configured to receive device measurements and to retrieve information related to a group of policies pertaining to the health of the device. The module may retrieve at least a subset of the policies based on the information, process the measurements with the at least a subset of the policies to determine the heal of the device, and generate policy results representing the health of the device based on the processing. The module may send the policy results to a component in the device, where the results are used by the component to allow the device to perform an operation when the health of the device meets a determined threshold.

In accordance with yet another implementation, a computer readable medium that stores instructions executable by a processing device is provided. The computer readable medium may include instructions for receiving policy information and instructions for retrieving a group of policies based on the policy information. The computer readable medium may include instructions for determining whether the device complies with the group of policies and instructions for producing policy results based on the determining. The computer readable medium may include instructions for sending the policy results to a policy decision point that is configured to implement at least a subset of the policies on behalf of a destination.

In accordance with still another implementation, a device is provided. The device may include means for receiving measurements from a source device via a first network and means for sending the measurements and policy information to a module. The device may include means for receiving a group of policy results from the module, where the croup of policy results is based on processing the measurements with a group of policies identified by the policy information. The device may include means for sending policy enforcement instructions to a network device configured to allow the source device to communicate with a protected device via a second network when the source device complies with at least a subset of the group of policies.

In accordance with yet another implementation, a module is provided. The module may include interface logic to receive measurements related to a client device, where the measurements are used to enforce a policy with respect to the client device and to receive information identifying a group of network policies related to the client device. The module may send policy results to a host device, where the policy results are related to the client device. The device may include storage logic to store or retrieve policy contents for the group of network policies. The device may include evaluation logic to process the measurements and the policy contents based on the information, and produce the policy results based on the processing, where the policy results are used by the host device to implement the network policies with respect to a destination device with respect to the client device.

In accordance with still another implementation, a device is provided. The device may include a module configured to retrieve information related to a group of policies pertaining to the health of the device and to retrieve at least a subset of the policies based on the information. The module may determine the health of the device using the subset of the policies and may generate policy results representing the health of the device based on the processing. The module may send the policy results to a component in the device, where the results are used by the component to allow the device to perform an operation when the health of the device meets a determined threshold.

In accordance with yet another implementation, a method is provided. The method may include receiving policy information related to a source device and identifying a group of policies related to the policy information. The method may include processing the policy information using the group of policies and determining policy results based on the processing. The method may include sending the policy results to a destination for use in enforcing at least a subset of the group of policies with respect to the source device.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5 illustrates an exemplary data structure for storing network policy information consistent with principles of the invention;

FIGS. 6A and 6B illustrate exemplary data structures that can be used by a server evaluation module to determine the compliance of a client device with network policies consistent with principles of the invention;

FIG. 7 illustrates an exemplary data structure that can be used to send policy evaluation results from a server evaluation module to a server consistent with principles of the invention;

DETAILED DESCRIPTION

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a server operating as a policy decision point to make determinations with respect to one or more network policies that can be implemented with respect to one or more client devices, or endpoints. "Policy," as used herein, refers to any set of rules or instructions that can be used to alter the operation of a device or network. For example, a policy can be used to prevent a device from accessing other devices unless the device complies with the policy. Policies can be used to determine the health, or status, of a device, such as by determining if a device is running a certain version of hardware or software. The server may use plug-in modules, such as server evaluation modules (SEMs), to perform processing operations with respect to the one or more network policies. For example, the server may send policy information for a number of policies to the SEM. The SEM may perform processing with respect to policies based on the policy information and measurement data received from a device being evaluated. The SEM may return a list of policy compliance results to the server. The server or the SEM may establish thresholds for policies related to the health of a device and may not allow the device to access network resources unless the health exceeds threshold values for the policies.

The server may process the policy compliance results and may send information about one or more network access decisions to a network device, such as a policy enforcement point. For example, the server may send a set of network access, or enforcement instructions to the network device. The network device may process the instructions and may grant or deny access to the one or more client devices according to network access decisions provided to the network device by the server.

Implementations described herein may operate with substantially any number of client devices, servers, server evaluation modules and/or network devices to implement substantially any number of network policies. Server evaluation modules, as described herein, may be configured to evaluate multiple policies at substantially the same time (e.g., in parallel) and/or to evaluate policies in a serial fashion (e.g., one at a time). In addition, implementations of policy decision points, SEMs, and/or policy enforcement points can be implemented in non-networked environments, such as in standalone devices.

Exemplary System

Figure 1:
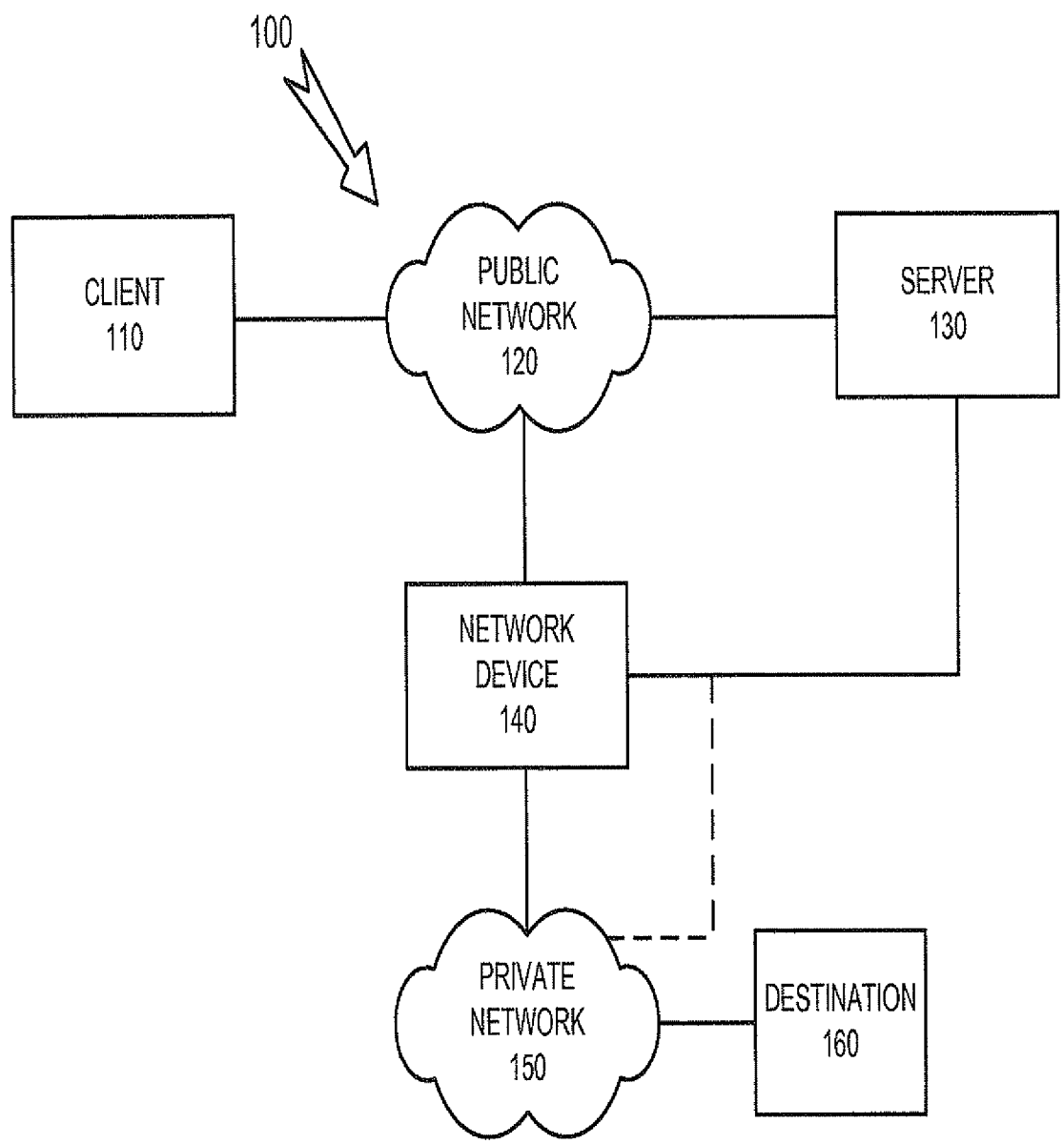
FIG. 1 illustrates an exemplary system that can be configured to operate in accordance with principles of the invention.

FIG. 1 illustrates an exemplary system that can be configured to operate in accordance with principles of the invention. System 100 may include a client 110, a public network 120, a server 130, a network device 140, a private network 150, and a destination 160.

Client 110 may include a device capable of making a data unit available to a network. "Data unit," as used herein, may refer to any type of machine-readable data having substantially any format that may be adapted for use in one or more networks, such as public network 120 and/or private network 150. A data unit may include packet data and/or non-packet data. Client 110 may include a computer, such as a desktop computer, a laptop computer, a client, a server, a personal digital assistant (PDA), a web-enabled cellular telephone, or another computation or communication device. In one implementation, client 110 may operate as a client device, or endpoint, and may attempt to access resources on private network 150, such as destination 160.

Public network 120 may include any network capable of transferring a data unit. Implementations of public network 120 may include local area networks (LANs), metropolitan area networks (MANS) and/or wide area networks (WANs), such as the Internet, that may operate using substantially any network protocol, such as Internet protocol (IP), asynchronous transfer mode (ATM), and/or synchronous optical network (SONET). Public network 120 may include network devices, such as routers, switches, firewalls, and/or servers (not shown). Public network 120 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Server 130 may include a device capable of receiving a data unit from, and transmitting a data unit to, another device and/or network. For example, server 130 may include a workstation, desktop computer, laptop computer, PDA, web enabled cellular telephone, Wi-Fi device, or another type of device. In one implementation, server 130 may provide a service to other devices in system 100, such as client 110 and/or destination 160. Server 130 may be configured to operate as an endpoint integrity server and may use one or more plug-in modules to implement substantially any number of network policies.

Network device 140 may include a device capable of receiving a data unit via a network. In one implementation, network device 140 may include an in-line device operating as an edge device between a first network and a destination device that may be operating on a second network. For example, network device 140 may operate as an edge device between an untrusted network, such as the Internet (e.g., public network 120), and a trusted network, such as a corporate LAN (e.g., private network 150). "Inline network device" may refer to any network device operating in a manner whereby all, or substantially all, data units intended for a destination device pass through the network device before reaching the destination device.

Network device 140 may include one or more devices such as routers, gateways, firewalls, switches, and/or servers. For example, network device 140 may operate as a router in cooperation with server 130 to provide communication services to a number of subscribers, such as client 110 and/or destination 160. In one implementation, server 130 may operate as a policy decision point and may determine if client 110 complies with one or more network policies, such as network policies for private network 150. Server 130 may communicate network policy information, such as policy enforcement instructions, to network device 140. Network device 140 may operate as a policy enforcement point on behalf of server 130 by allowing client 110 to access resources on private network 150 when client 110 is authorized to do so according to one or more network policies administered by server 130.

Private network 150 may include any network capable of transporting a data unit. Private network 150 may be a secure network such as a LAN associated with a corporation. Private network 150 may be configured so that all, or substantially all, data units intended for a device operating on private network 150 pass through network device 140. For example, network device 140 may operate to prevent data units from reaching a protected device, such as destination device 160, unless a sending device is authorized to send data units to destination 160 according to one or more network policies administered by server 130.

Destination 160 may include a device capable of making a data unit available to a network or capable of receiving a data unit from a network. Destination 160 may include a computer, such as a desktop computer, a laptop computer, a client, a server, a personal digital assistant (PDA), a web-enabled cellular telephone, or another computation or communication device. Access to destination 160 may be controlled via one or more network policies administered via server 130 and/or enforced by network device 140. A sending device may be allowed to exchange information with destination 160 when the sending device complies with one or more network policies related to destination 160. Implementations of destination device 160 may be configured to operate on private network 150 without having to know about network policies administered by server 130 and/or network device 140.

Exemplary Device Architecture

Figure 2:
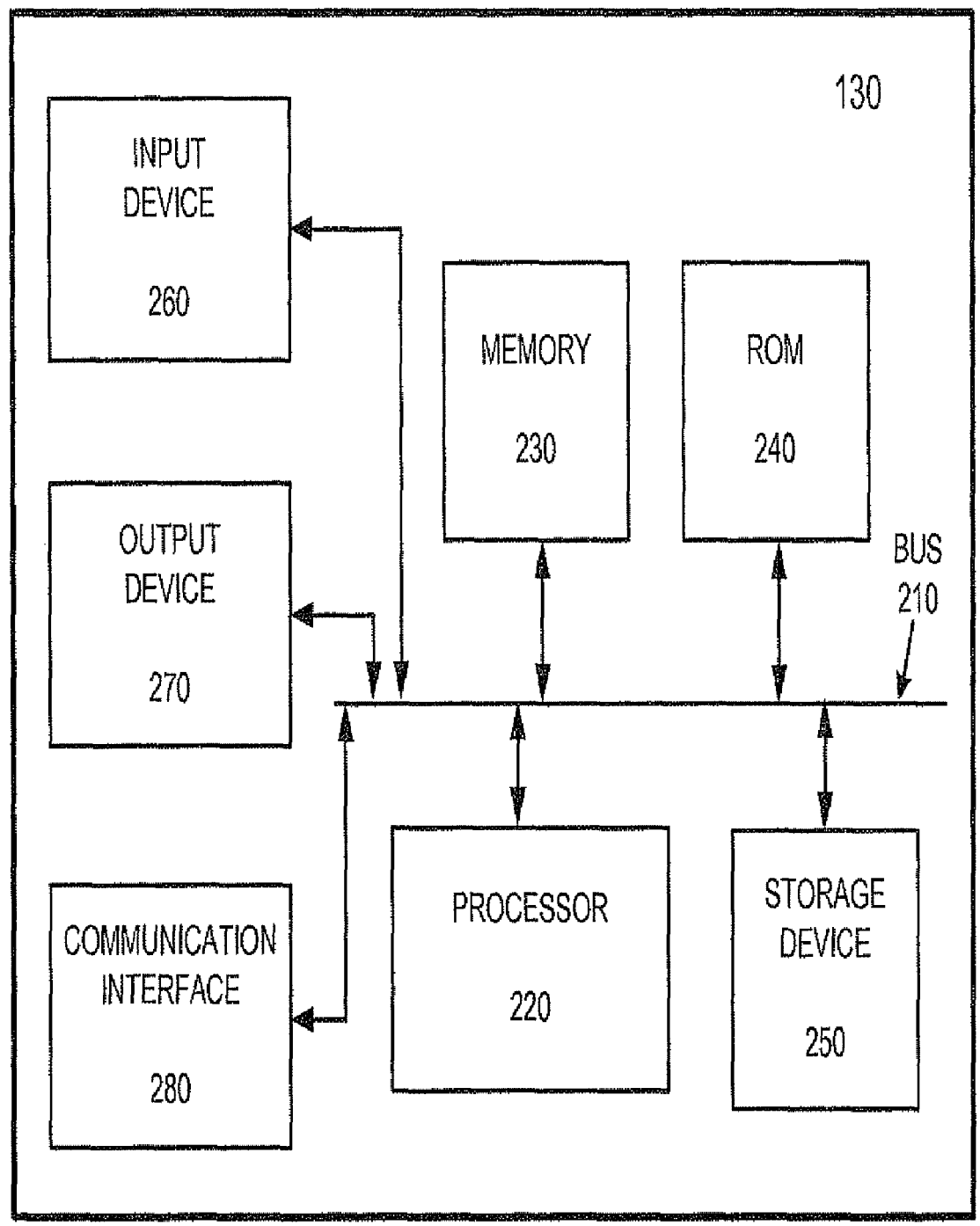
FIG. 2 illustrates an exemplary architecture for implementing the server device of FIG. 1 consistent with principles of the invention.

FIG. 2 illustrates an exemplary architecture for implementing server 130 of FIG. 1 consistent with principles of the invention. It will be appreciated that client 110, network device 140, destination 160 and/or other devices in system 100 may be similarly configured. As illustrated in FIG. 2, server 130 may include a bus 210, a processor 220, a memory 230, a read only memory (ROM) 2407 a storage device 250, an input device 2607 an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to server 130, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as client 110 or network device 140. For example, communication interface 280 may include one or more interfaces, such as a first interface coupled to public network 120 and/or a second interface coupled to private network 150. Alternatively, communication interface 280 may include other mechanisms for communicating via a network, such as private network 150 and/or public network 120.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Server Functional Diagram

Figure 3:
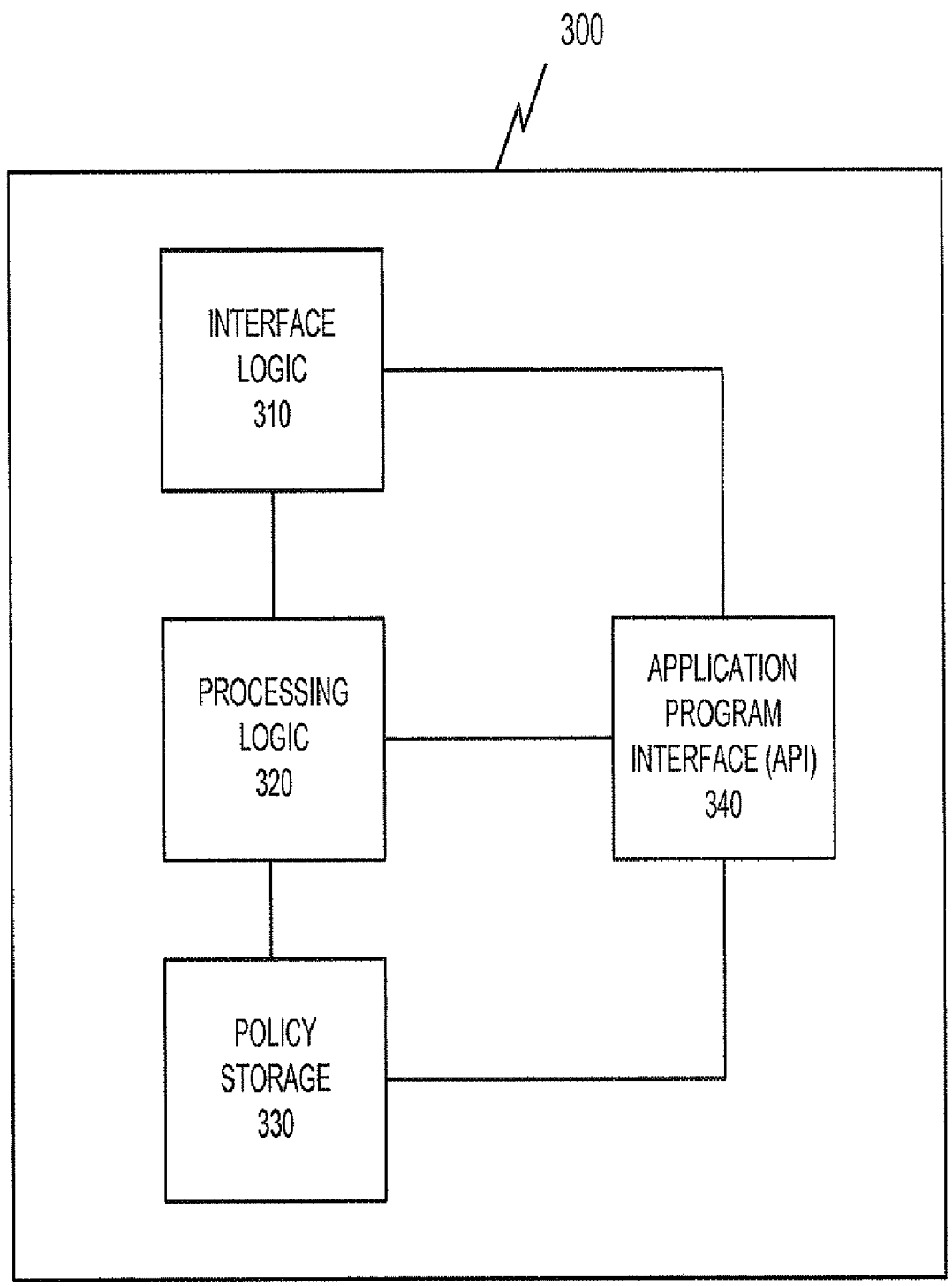
FIG. 3 illustrates an exemplary functional diagram of the server of FIG. 2 consistent with principles of the invention.

FIG. 3 illustrates an exemplary functional diagram of server 130 of FIG. 2 consistent with principles of the invention. The functional diagram of FIG. 3 may include interface logic 310, processing logic 320, policy storage 330, and application program interface (API) 340. The implementation of FIG. 3 is exemplary, and server 130 may include more or fewer functional components without departing from the spirit of the invention.

Interface logic 310 may include hardware or software to send or receive information to a destination. In one implementation, interface logic 310 may send a request for compliance measurements to client 110 and may receive a response from client 110. In another implementation, interface logic 310 may send enforcement instructions to network device 140. Interface logic 310 may be implemented in communication interface 280 or elsewhere in server 130.

Processing logic 320 may include hardware or software to process instructions or data related to operations performed by server 130. For example, processing logic 320 may be implemented in processor 220 and may operate on a response from client 110 to extract information therein. Processing logic 320 may make processed information available to another device, software module, or component operating in server 130, such as a SEM or network device 140.

Policy storage 330 may include hardware or software logic to store information related to network policies. For example, server 130 may store information related to an antivirus policy or a network security policy in policy storage 330. An antivirus policy may be used restrict access to destination 160 unless a sending device complies with the antivirus policy, such as by running a certain version of antivirus software or by having certain virus definitions loaded thereon. Server 130 may send antivirus information to a SEM so that the SEM can determine whether the sending device complies with the antivirus policy.

API 340 may include hardware or software logic to enable server 130 to communicate with one or more SEMs. An API may include machine-executable instructions that send information to, or receive information from, applications, such as software modules. API 340 may allow server 130 to send information, such as policy identifiers, to SEMs and to receive information from SEMs, such as policy results. An API 340 may be adapted to communicate with a number of SEMs, or server 130 may run a number of APIs 340, where each API 340 is adapted to communicate with one or more SEMs. For example, server 130 may run an antivirus API to communicate with an antivirus SEM. Implementations of API 340 may be configured to communicate with SEMs and/or other modules, devices, or software applications.

Exemplary Server Evaluation Module Functional Diagram

Figure 4:
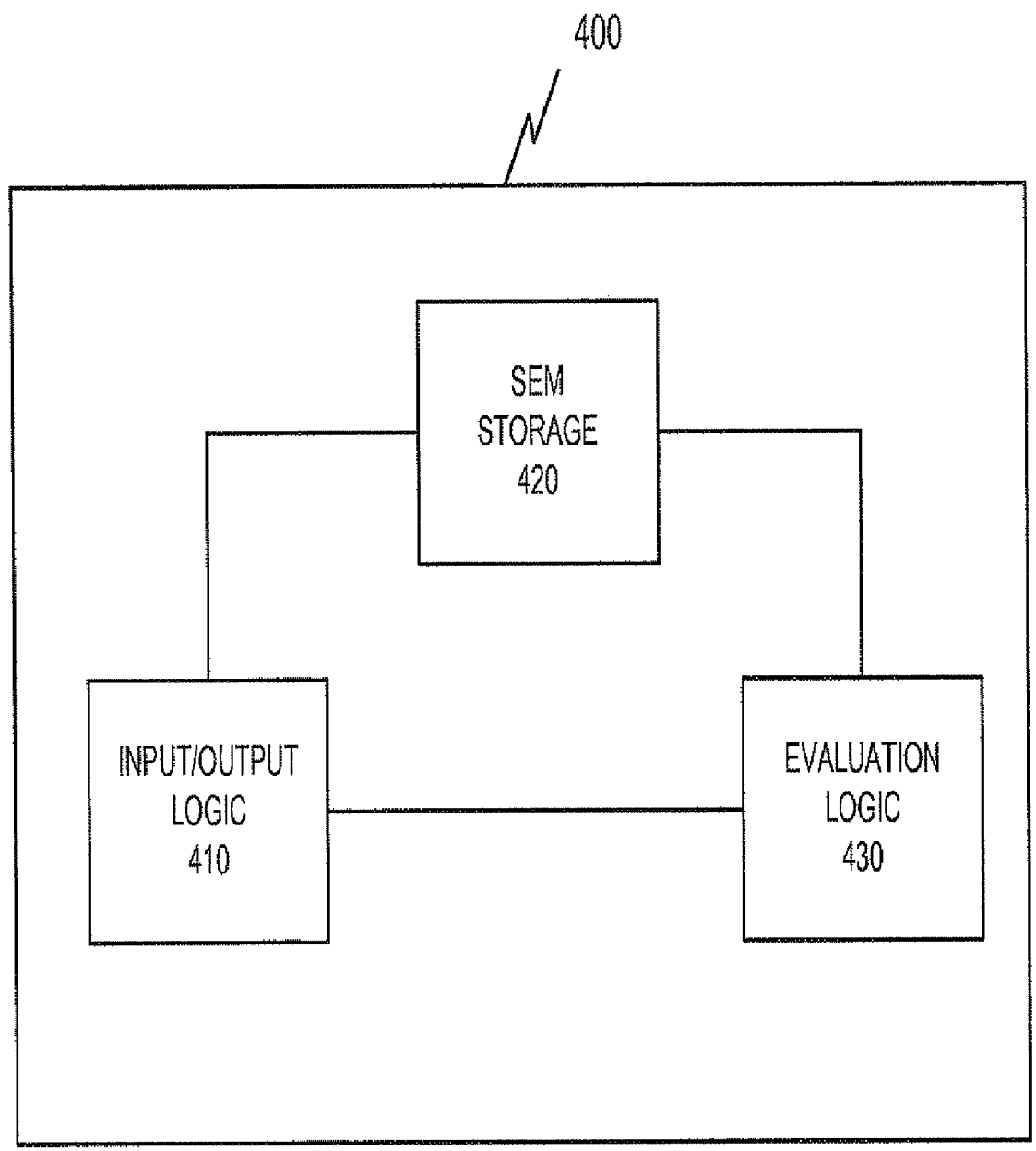
FIG. 4 illustrates an exemplary functional diagram of a server evaluation module consistent with principles of the invention.

FIG. 4 illustrates an exemplary functional diagram of a server evaluation module 400 consistent with principles of the invention. SEM 400 may include hardware or software based logic configured to execute instructions to evaluate one or more policies. In one implementation, SEM 400 may be implemented as an extensible plug-in module in server 130. A plug-in module may include self-contained logic adapted execute instructions to perform an operation on behalf of a host device. A plug-in module may be configured to be moveable from one host device to another host device without requiring substantial modifications to the receiving host device in order to host and/or interact with the plug-in module. An extensible plug-in module may be adaptively sized or scaled to accommodate substantially any number of network policies. Implementations of SEM 400 may determine policy requirements by retrieving policy details from a database.

In a first implementation, SEM 400 may reside locally on server 130. For example, a software based implementation of SEM 400 may reside in memory 230 and may execute in processor 220 and/or processing logic 320. SEM 400 may communicate with server 130 via API 340 when SEM 400 resides locally with respect to server 130. In a second implementation, SEM 400 may be remotely located with respect to server 130 and may communicate with server 130 via a network and/or a dedicated link. Remote implementations of SEM 400 may communicate with server 130 via a protocol, such as a communication protocol.

SEM 400 may include input/output (I/O) logic 410, SEM storage 420, and evaluation logic 430. I/O logic 410 may include hardware or software to receive information from server 130 or to send information to server 130. For example, I/O logic 410 may receive client measurements, policy identifiers (IDs), and/or policy contents from server 130. I/O logic 410 may send policy compliance results, remediation instructions, etc., to server 130. In one implementation, I/O logic 410 may receive a list of policy identifiers, names, or contents and may return a list of policy compliance results or a policy list (e.g., a list of polices that client 110 is in compliance with) to server 130. Implementations of I/O logic 410 may be further configured to send and/or receive information to/from other devices, software modules, etc. In one implementation, I/O logic 410 may interact with API 340 to exchange information with server 130.

SEM storage 420 may include hardware or software logic to store one or more network policies, network policy parameters, network policy results, and/or other information that can be used by SEM 400 when determining policy requirements and/or producing policy compliance results. SEM storage 420 may reside locally with SEM 400 and/or may reside elsewhere, such as in memory 230 or in another device in system 100. In one implementation, SEM storage 420 may include a database containing, substantially any number of policies. SEM 400 may update SEM storage 420 with new policies and/or policy information as needed.

Evaluation logic 430 may include hardware or software that performs operations on measurements received from server 130 on behalf of client 110. For example, server 130 may receive measurement data from client 110. Server 130 may forward the measurement data, one or more policy IDs, and/or policy contents for one or more policies to SEM 400. Evaluation logic 430 may map policy IDs to policies and may process the measurement data, using the policy IDs, policy contents, and/or other policy related information in SEM storage 420. SEM 400 may determine the compliance of client 110 with respect to one or more network policies via evaluation logic 430. Evaluation logic 430 may reside locally in SEM 400 or may reside elsewhere in server 130, such as in processor 220, or elsewhere in system 100.

Exemplary Data Structure

FIG. 5 illustrates an exemplary data structure 500 for storing network policy information consistent with principles of the invention. Data structure 500 may be implemented via a computer-readable medium that can be used to store information in a machine-readable format. In an exemplary implementation, data structure 500 may be implemented as a table that may include information that identifies client 110, network policies, data formats, network policy test results, and network status details related to the implementation of one or more network policies. In one implementation, data structure 500 may be implemented in server 130 via memory 230 or via storage device 250.

Data structure 500 may include information arranged in fields, such as client ID field 510, check field 520, policy field 530, SEM format field 540, result field 550, and implement field 560. Information stored in data structure 500 may be arranged in a row and column format to facilitate interpretation by a user of server 130 and/or processing logic 320. Entries 502-508 may be used to identify information associated with client ID field 510, check field 520, policy field 530, SEM format field 540, result field 550, and implement field 560. Implementations of server 130 may include one or more data structures, such as data structure 500 and 500A. Data structure 500A may include similar or the same fields as data structure 500. For example, data structure 500 may include information related to an antivirus policy and/or an antivirus SEM and data structure 500A may include information related to a security policy and/or a security SEM.

Client ID 510 may include information that identifies client 110 or a user of client 110. For example, client ID 510 may include an internet protocol address, a group or department name, a geographic location identifier, such as a room number or street address, a user's name, user's social security number, etc.

Check 520 may include information to indicate when the compliance of client 110 should be determined. For example, "sign on" may indicate that the compliance, or health, of client 110 should be checked when client 110 attempts to sign on, or log into, a network. "Change" may indicate that the compliance of client 110 should be checked when there is a change in the network or a determined parameter related to the network. For example, the compliance of client 110 may be checked when a device on a network goes down or when malicious data units are detected in the network. "Periodic" may indicate that the compliance of client 110 should be checked periodically, such as at determined intervals, while client 110 is connected to the network. The status of client 110 may also be checked at other times or during other events. For example, a compliance check of client 110 may be triggered when client 110 attempts to access a certain resource, such as destination 160.

Policy 530 may include information that identifies one or more network policies related to client 110. For example, policy 530 may indicate that client 110 should be evaluated with respect to an antivirus policy, an operating system (O/S) policy, a security policy, a special policy, etc. A special policy may include a policy that is related to a certain destination, such as a device containing sensitive information. In other implementations, a special policy may include other types of information.

SEM format 540 may include information that identifies a format for client device related information that is sent from server 130 to SEM 400. For example, server 130 may send a policy name to SEM 400 for a client 110 in entry 502, a policy ID and policy contents for a client 110 in entry 504, and policy ID and client data for a client 110 in entry 508. Information in SEM format 540 may be in substantially any form.

Result 550 may include information that identifies a result produced by SEM 400. A result produced by SEM 400 may include information that can be used to determine the compliance of client 110 with respect to one or more network policies. Result 550 may be represented in substantially any form. For example, a result can be provided as a "pass" or "fair" entry, on a graduated scale, such as 4 out of a possible 5, as a percentage, or as another form, such as fully compliant, partially compliant, satisfactory, etc. Result 550 may also include a link or address that references a file or another data structure that includes result information related to client 110.

Implement 560 may include information that identifies whether a policy related to client 110 has been implemented with respect to client 110. For example, server 130 may send a policy ID and client 110 measurements to SEM 400. SEM 400 may process the measurements based on the policy ID and may return a result. Server 130 may send the result to network device 140 as an enforcement instruction so that network device 140 can enforce the policy with respect to client 110. Implement field 560 may include "yes" when result 550 has been accepted by network device 140 and may include "no" when result 550 has not been accepted by network device 140.

Exemplary Server Evaluation Module Data Structures

FIGS. 6A and 6B illustrate exemplary data structures 600 and 602 that can be used by a server evaluation module to determine the compliance of a client device. Data structures 600 and 602 may be implemented via a computer-readable medium that can be used to store information in a machine-readable format. In an exemplary implementation, data structures 600 and 602 may be implemented as tables that may include information that identifies client 110, and/or one or more policies, sub-policies, policy test results, and/or policy related instructions, such as remediation instructions. Implementations of SEM 400 may include substantially any number of data structures 600 and 602. Data structures 600 and 602 may be stored in SEM 400 or may be stored elsewhere, such as in memory 230.

Data structure 600 may include policy ID field 610, sub-policy field 620 and sub-policy result field 630. Policy ID 610 may include information that identifies one or more policies that are related to the content of data structure 600. For example, an implementation of data structure 600 may include "antivirus" in policy ID 610 when data structure 600 includes information about policies or sub-policies related to antivirus software running on client 110.

Sub-policy 620 may include information related to one or more sub-policies that are related to a policy identified in policy ID 610. A sub-policy may include one or more items that collectively form a policy. Sub-policies may include requirements that must be met in order for a device, such as client 110, to be identified as complying with the sub-policies. For example, an antivirus policy may include an email sub-policy that includes antivirus information related to an email application running on client 110 and a firewall sub-policy that includes antivirus information related to a firewall application that is running on client 110. An operating system sub-policy may include antivirus information related to an operating system on client 110, and other sub-policies may include antivirus information related to other applications operating on client 110, such as a firewall or a web browser. The use of sub-policies may allow SEM 400 to arrange policy related information in a hierarchy to facilitate policy-based evaluations with respect to client 110. Other implementations of SEM 400 may or may not use sub-policies. For example, data structure 600 may include information for a number of policies.

Sub-policy result 630 may include information that identifies a result related to a sub-policy. Implementations of sub-policies may be configured to operate with sub-policy results and/or to operate without sub-policy results. For example, an email sub-policy may include a number of requirements. The email sub-policy may produce sub-policy result 630 when client 110 complies with the requirements in the email sub-policy. An entry of "passed" in sub-policy result 630 may identify that an email application running on client 110 must be compliant with one or more requirements in a sub-policy and/or with one or more sub-policies pertaining to the email application.

Sub-policies may be made up of information, such as patches. For example, an email sub-policy may include a number of patches that collectively make up the email sub-policy. SEM 400 may store information related to a sub-policy in data structure 602. Data structure 602 may include sub-policy ID 640, patch ID 650, and version ID 660. SEM 400 may maintain logical connections between information in data structure 602, information in data structure 600, and/or information stored elsewhere in SEM 400.

Sub-policy ID 640 may include information that identifies a sub-policy in data structure 600, such as a sub-policy identified in sub-policy 620. Patch ID 650 may include information that identifies items making up the sub-policy identified in sub-policy ID field 640. For example, "SPAM patch" may identify a patch that is used to prevent SPAM from being placed into an inbox on client 110. "Pornography patch" may refer to a patch that prevents pornographic images from being sent from or received by an email application operating on client 110. ".exe patch" may identify a filter that prevents client 110 from receiving attachments that contain executable files, and an "urban legend patch" may identify a patch that prevents hoax messages from being placed into an inbox on client 110. Patches identified via patch ID 650 may be related to version, or revision, numbers via version ID 660. Version ID 660 may include information that can be used to determine if a patch identified by patch ID 650 is up-to-date. SEM 400 may store details about items in patch ID 650, such as executable code making up a patch, in data structure 602 and/or in another data structure (not shown in FIG. 6A or 6B).

In one implementation of SEM 400, patch ID 650 may identify patches that are related directly to a policy identified in policy ID 610 without to the use of intervening sub-policies. Implementations of SEM 400 may update information in data structures 600 and 602 based on changes to system 100. For example, version ID 660 for a SPAM patch may be updated from 6.1 (FIG. 6B) to 6.2 (not shown) when SEM 400 receives a new patch from a vendor that makes an antivirus application used in system 100.

FIG. 7 illustrates an exemplary data structure 700 that can be used to send policy evaluation results from a server evaluation module to a server consistent with principles of the invention. Data structure 700 may include policy ID field 610, sub-policy field 620, sub-policy result field 630, client ID field 710, policy result field 720, and instructions field 730. Policy ID 610, sub-policy 620 and sub-policy result 630 may be implemented as described in conjunction with FIGS. 6A and 6B above.

Client ID 710 may identify a client 110 for which SEM 400 evaluated one or more policies and/or sub-policies. For example, server 130 may have queried SEM 400 to evaluate a client device used by Bill Smith for compliance with an antivirus policy. SEM 400 may map the antivirus policy to a number of antivirus related sub-policies that collectively make up the antivirus policy. SEM 400 may provide server 130 with result information for each sub-policy that was evaluated on behalf of client 110 (Bill Smith). For example, SEM 400 may provide server 130 with a list of policy and/or sub-policy results.

Policy result 720 may include information that identifies a compliance result for the policy identified in policy ID 610. SEM 400 may process entries in sub-policy result 630 to determine a value for policy result 720. For example, SEM 400 may use logical operators, e.g. AND, OR, NOR, etch, to compare two or more sub-policy results that are related to a policy identified in policy ID 610. SEM 400 may determine a final result based on the comparison and may place the result in policy result 720. Policy result 720 may include substantially any type of information, such as passed, failed, 90% compliant, two out of three, etc.

Instructions 730 may include information that can be used by server 130 and/or client 110 to perform remediation operations when client 110 fails to comply with one or more policies and/or sub-policies. Instructions 730 may also include explanations of policy/sub-policy evaluations that were performed with respect to client 110, results produced by policy testing on behalf of client 110, and/or other types of information that may be useful to server 130, client 110 and/or network device 140 with respect to one or more network polices/sub-policies.

Exemplary Message Exchange

Figure 8:
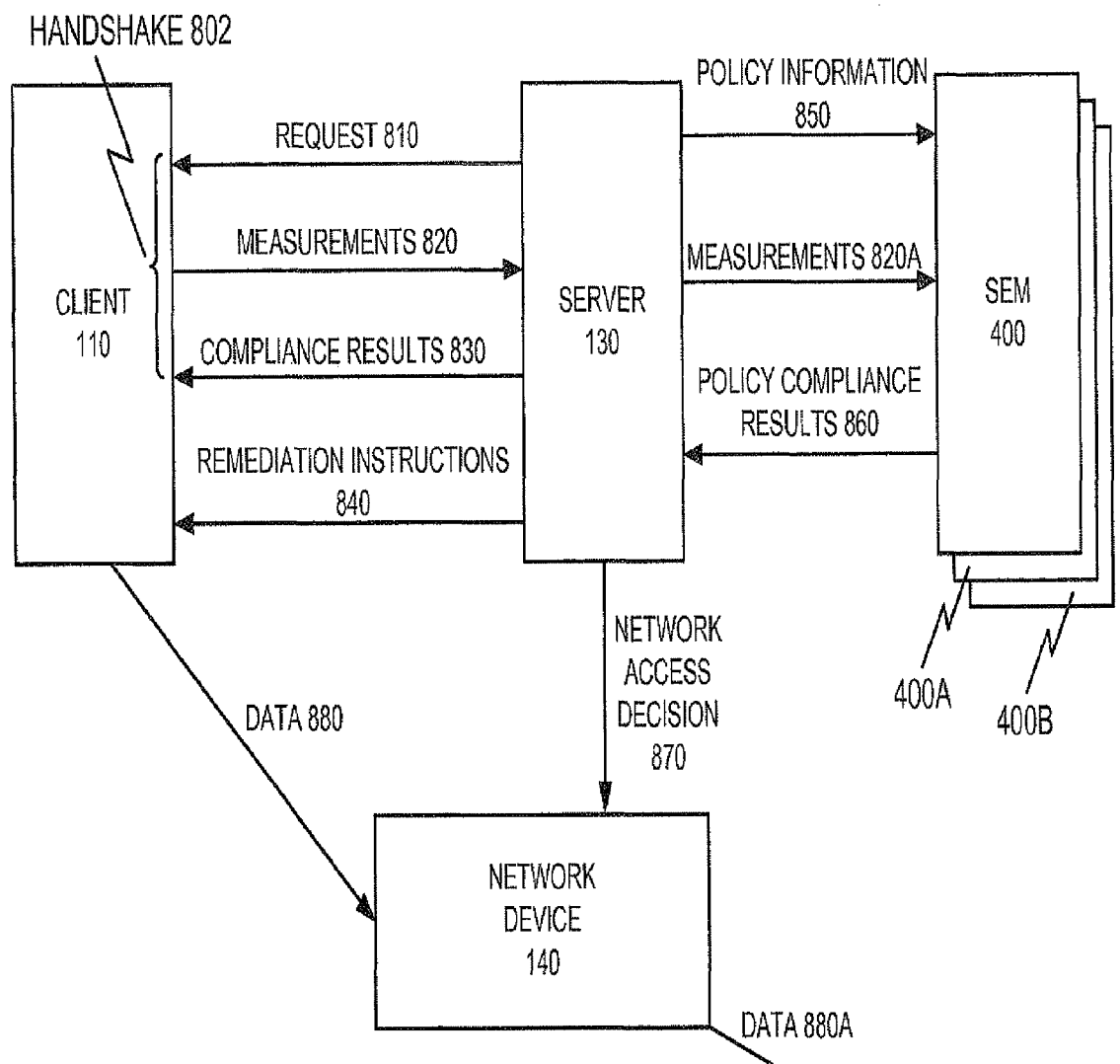
FIG. 8 illustrates exemplary messages that can be exchanged between a client device, a server, a server evaluation module and a network device to implement network policies consistent with principles of the invention.

FIG. 8 illustrates exemplary messages that can be exchanged between client 110, server 130, server evaluation module 400 and network device 140 to implement network policies consistent with an implementation of the invention. Other implementations may include more or fewer messages and/or may include other types of messages without departing from the spirit of the invention.

The implementation of FIG. 8 may include client 110, server 130, network device 140 and one or more SEMs 400, 400A and 400B. The devices of FIG. 8 may exchange messages, such as request 810, measurements 820, measurements 820A, compliance results 830, remediation instructions 840, policy information 850, policy compliance results 860, network access decision 870, data 880 and data 880A.

In one implementation, server 130 and client 110 may use a handshake 802 to exchange compliance information therebetween. Handshake 802 may include request 810, measurements 820, compliance results 830, and/or remediation instructions 840. Other implementations may include more or fewer messages in handshake 802. Request 810 may include a query from server 130 to client 110 for compliance information. For example, client 110 may attempt to log onto private network 150. Server 130 may be configured to determine the health, or compliance, of client 110 before allowing client 110 to access private network 150. Server 130 may send request 810 to client 110 when client 110 attempts to log onto private network 150. In other implementations, server 130 may send request 810 to client 110 when a change is detected in private network 150 or in client 110, at periodic intervals determined by server 130, and/or when network policies or sub-policies change. In still other implementations, request 810 may not be used.

Measurements 820 may include information that can be used by server 130 and/or SEM 400 to determine the compliance of client 110 with respect to one or more network policies. For example, in one implementation, server 130 may receive information about software revisions installed on client 110, patches to software applications operating on client 110, antivirus definition updates installed on client 110, hardware configurations implemented on client 110, files residing on client 110, and/or destination devices that client 110 is trying to contact. The implementation of FIG. 8 shows measurements 820 being provided to server 130. Other implementations (not shown in FIG. 8) may omit measurements 820 and/or measurements 820A. Still other implementations (not shown in FIG. 8) may have client 110 send measurements to another device or have the other device generate measurements without assistance from client 110, where the other device sends the measurements to server 130, and/or SEM 400, 400A, or 400B.

Measurements 820A may include information in measurements 820 and/or may include additional information. For example, server 130 may supplement measurements 820 with information that identifies server 130 and/or prior measurements obtained from client 110. Server 130 may send the supplemented measurements to SEM 400, 400A and/or 400B as measurements 820A.

Compliance results 830 may include information that informs client 110 about the results of policy and/or sub-policy compliance evaluations performed on behalf of client 110. For example, compliance results 830 may inform client 110 whether it will be allowed to connect to a certain resource on private network 150. In one implementation, compliance results 830 may include an authorization mechanism, such as a code. The code may include a cookie, a key, or an authorization code that client 110 can use to verify its compliance with one or more network policies to network device 140 and/or destination 160.

Remediation instructions 840 may include information that can be used by client 110 to correct deficiencies with respect to one or more policies. For example, when client 110 is not compliant with a policy or sub-policy, remediation instructions may provide client 110 with a link to a web site that includes updates that will bring client 110 into compliance. In another implementation, remediation instructions 840 may provide client 110 with software that can be run to bring client 110 into compliance. In yet another implementation, remediation instructions 840 may include text that can be used by an operator of client 110 to bring client 110 into compliance.

Policy information 850 may include information that identifies one or more policies related to client 110. Policy information 850 may include information identifying a single policy or multiple policies, and server 130 may send policy information 850 to a single SEM, such as SEM 400, or to multiple SEMs, such as SEMs 400, 400A and 400B. Server 130 may map policy information with measurements 820 and may send policy information 850 to SEM 400, 400A and 400B with measurements 820A. In one implementation, policy information 850 may identify a network policy by name, number, or other identifier. In another implementation, policy information 850 may include the contents of one or more policies that SEM 400, 400A and 400B is being asked to evaluate. In still another implementation, policy information 850 may include information about the contents of one or more sub-policies. Server 130 may retrieve information from data structure 500 and may send the retrieved information to SEM 400, 400A and 400B via policy information 850.

Policy compliance results 860 may include information that identifies one or more results related to the evaluation of one or more policies or sub-policies on behalf of client 110. In one implementation, SEM 400, 400A and 400B may send data structure 700 to server 130 via policy compliance results 860. In one implementation, data structure 700 may include a list of policy results that server 130 can map to measurements 820 and/or policy information 850.

Network access decision 870 may include information that can be used by network device 140 to grant or deny access to client 110 with respect to private network 150. In one implementation, network access decision 870 may provide network device 140 with a list of destination names, destination addresses, destination directories, destination files, etc. with which client 110 is allowed to communicate. Server 130 may provide network device 140 with information that identifies resources that client 110 is allowed to access, information that identifies resources that client 110 is not allowed to access, and/or may provide information that identifies resources that client 110 is and is not allowed to access. Network access decision 870 may include an enforcement instruction, an authorization instruction, etc.

Data 880 and 880A may include information that client 110 exchanges with network device 140 and/or destination 160 when client 110 is compliant with one or more policies. Network device 140 may receive data from client 110 and may forward received data to destination 160 as data 880A when client 110 is determined to be in compliance with one or more network policies related to destination 160.

Messages exchanged between the devices of FIG. 8 may be exchanged via public network 120, private network 150, and/or dedicated links. In addition, the devices of FIG. 8 may communicate with encrypted and/or unencrypted data units using one or more communication protocols.

Exemplary Processing

Figure 9:
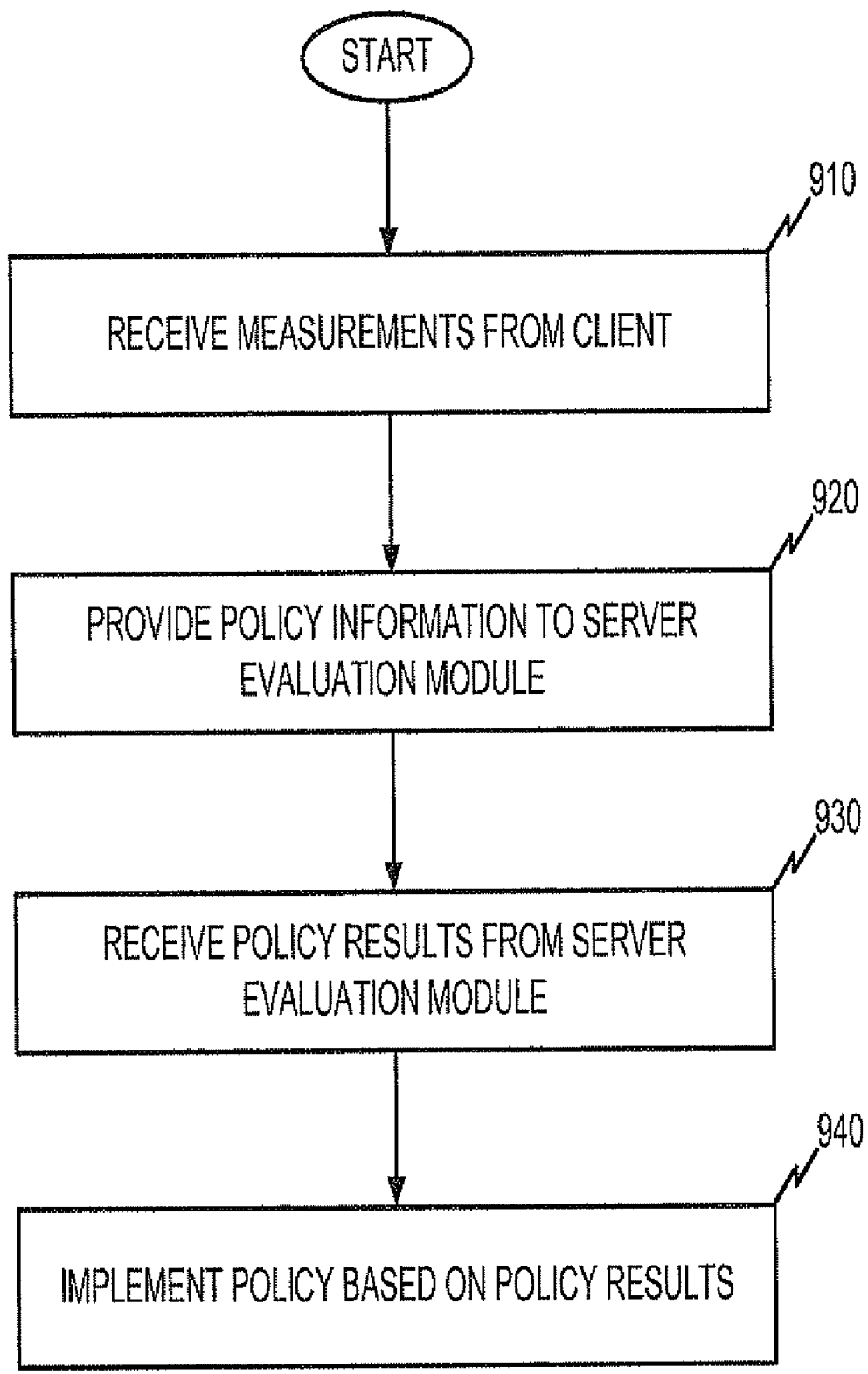
FIG. 9 illustrates exemplary processing to evaluate and implement network policies consistent with principles of the invention.

FIG. 9 illustrates exemplary processing to evaluate and implement network policies consistent with principles of the invention. In one implementation, the exemplary processing of FIG. 9 may be performed by server 130. In other implementations, exemplary processing may be performed by other devices, such as network device 140 and/or destination 160. Implementations described herein may be used to evaluate the health, or compliance, of a client device. For example, client 110 may be checked to determine if its software and/or hardware meets a determined criteria, e.g., a revision level or a certain configuration, to determine if client 110 is associated with a proper user identity, to determine whether client 110 is allowed to access certain network resources, e.g., destination 160, etc.

Server 130 may be configured as a policy decision point in a network. Server 130 may determine the compliance of a device, such as client 110, before letting the device access a portion of a network. Server 130 may be configured to determine the compliance of client 110 at determined times. In one implementation, server 130 may check the compliance of client 110 when client 110 attempts to access a network, such as private network 150. In a second implementation, server 130 may determine the compliance of client 110 at determined intervals, such as once per day, when a change in a network parameter occurs, when malicious activity is detected on private network 150, when a new network policy is implemented, or when client 110 attempts to access a protected resource. Server 130 may retrieve information from data structure 500 to determine when client 110 should be checked for compliance with respect to one or more network policies.

Server 130 may interact with client 110 to determine the compliance of client 110. For example, server 130 may send a request, such as request 810, to client 110. Request 810 may inform client 110 that server 130 is seeking compliance information. In another implementation, client 110 may be configured to send compliance information, such as measurements 820, to server 130 based on an event, such as plugging into a wall port that is related to a network.

Server 130 may receive measurements 820 from client 110 (block 910). Client 110 may produce measurements 820 by running a script, by reading information from a table, such as a configuration table, etc. Measurements 820 may be sent to server 130 via public network 120, another network, and/or a dedicated link. Measurements 820 may further be sent from client 110 to server 130 in an encrypted format or an unencrypted format. Server 130 may store measurements 820 in a data structure in memory 230 and/or may process measurements 820, such as by decrypting measurements 820 or by converting measurements 820 into a format compatible with SEM 400. In one implementation, server 130 may send measurements 820 to SEM 400 as measurements 820A.

Server 130 may provide policy information to SEM 400 (block 920). Policy information may include policy IDs, policy names, and/or policy contents. For example, server 130 may send SEM 400 policy names that are related to policies pertaining to client 110. Assume that client 215.123.1.1 provides compliance information at network sign on (check 520, FIG. 5). Further assume that server 130 may determine that client 215.123.1.1 should be evaluated with respect to an antivirus policy by retrieving information for policy 530 related to client 215.123.1.1 (entry 502). Server 130 may send the antivirus policy name to SEM 400 since SEM format 540 indicates "policy name" for client 215.123.1.1.

Server 130 may be configured to provide policy related information to SEM 400 in a variety of formats. For example, server 130 can provide SEM 400 with a policy name, as discussed above, a policy ID, such as a policy number, and/or policy contents. Assume server 130 may use "policy name: antivirus," "policy ID A-165," or "policy contents: antivirus-.patch.26" to inform SEM 400 that client 110 should be evaluated with respect to an antivirus policy. Server 130 may send a policy ID, name, or contents to SEM 400 as policy information 850 before sending measurements 820A to SEM 400, after sending measurements 820A to SEM 400, or at substantially the same time that measurements 820A are sent to SEM 400.

Server 130 may communicate with SEM 400 via an API when SEM 400 is operating on server 130. For example, an API may be used to communicate with SEM 400 when SEM 400 is implemented as a plug-in module operating on server 130. In an alternative implementation, SEM 400 may be remotely located with respect to server 130. For example, SEM 400 may be installed on a remote device with respect to server 130 and coupled to server 130 via a link. Server 130 may communicate with a remote SEM 400 via a communication protocol. Implementations of server 130 may send multiple policy IDs, names, or contents to SEM 400 via policy information 850 (e.g., in a parallel arrangement) or server 130 may queue policy IDs, names and/or contents and may send them to SEM 400 one at a time (e.g., in a serial arrangement).

SEM 400 may simultaneously check the compliance of an end point with respect to two or more policies. For example, SEM 400 may determine if client 110 is compliant with a first email policy related to a first portion of private network 150 and whether client 110 is compliant with a second email policy related to a second portion of private network 150 at substantially the same time. SEM 400 may determine when client 110 is compliant with the two or more policies using one or more data structures, such as data structure 600 (FIG. 6A)

In one implementation, SEM 400 may maintain policy related information in a hierarchy, such as by relating one or more sub-policies to a policy. For example, an antivirus policy may require that components, or subsystems, on client 110 are compliant with one or more antivirus sub-policies. Assume that antivirus policy (policy ID 610) (FIG. 6A) includes an email sub-policy, an operating system sub-policy, a firewall sub-policy, a web browser sub-policy, and a data files sub-policy. Further assume that SEM 400 may be configured to determine the compliance of client 110 with respect to some or all sub-policies when determining the compliance of client 110 with respect to a policy.

SEM 400 may relate each sub-policy in data structure 600 to a list of requirements or items. In one implementation, requirements may be software patches that can be identified via patch IDs 650 (FIG. 6B). SEM 400 may check client 110 with respect to patch IDs 650 by determining if client 110 is running particular versions of respective patches. For example, SEM 400 may determine if client 110 is compliant with an email sub-policy by retrieving information from a data base. For example, SEM 400 may access data structure 602 to determine if client 110 is running necessary patches making up the email sub-policy. In one implementation, SEM 400 may determine if client 110 is running SPAM patch 6.1 (FIG. 6B) to prevent SPAM from being downloaded onto client 110 via an email application, pornography patch 1.0 (FIG. 6B) to block pornographic information from being downloaded onto client 110 via an email application and/or from being uploaded from client 110 to another device, .exe attachment patch 3.1 (FIG. 6B) to block attachments containing executable files from being downloaded onto client 110 via an email application, and urban legend patch 2.0 (FIG. 6B) to prevent hoax emails from being downloaded onto client 110 via an email application and/or uploaded from client 110 to another device.

SEM 400 may determine sub-policy results 630 for one or more sub-policies by evaluating measurements 820A with respect to sub-policy information in data structure 602. SEM 400 may further determine policy result 720 (FIG. 7) based on entries in sub-policy result 630 (FIG. 6A). For example, SEM 400 may determine that client 110 is not compliant with an antivirus policy because client 110 was not compliant with a web browser sub-policy (FIG. 6A). SEM 400 may populate policy result 720 with "FAILED" for an antivirus policy related to a device associated with Bill Smith.

SEM 400 may return policy results to server 130. For example, server 130 may send a list of three policies to SEM 400. After determining the compliance of client 110 with respect to the three policies, SEM 400 may return three policy results to server 130.

Server 130 may receive policy results from SEM 400 (block 930). For example, SEM 400 may generate data structure 700 and may populate data structure 700 with information related to policy and/or sub-policy results. In one implementation, data structure 700 may identify client 110 via client ID field 710 and may identify policies that were evaluated via policy ID 610. Data structure 700 may further include policy result 720 that may indicate whether client 110 is compliant with one or more policies administered by server 130. Data structure 700 may include sub-policy results 630 that may include results for respective sub-policies that are related to a policy identified by policy result 720 and/or policy ID 610. Data structure 700 can be configured to include remediation instructions 720 that may be used by server 130 to inform client 110 with respect to actions that client 110 may need to perform to become compliant with one or more network policies administered by server 130.

Server 130 may implement a policy based on policy results (block 940). To implement a policy, server 130 may extract information from data structure 700 and may send extracted information to network device 140. For example, server 130 may map policy result 720 (e.g., that client 110 related to Bill Smith failed an antivirus policy compliance check) to information in a database to determine whether client 110 can access any portions of private network 150 while running non-compliant antivirus software. For example, server 130 may determine that client 110 can access virtual LAN 1 (VLAN 1) while running non-compliant antivirus software when VLAN1 includes only a portal to the world wide web. Server 130 may send a message, such as "Bill_Smith:V-LAN1," to network device 140 when client 110 can access certain resources, such as VLAN1, on private network 150. Alternatively, server 130 may determine that client 110 cannot access any resources on private network 150 while running non-compliant antivirus software. Server 130 may send a message, such as "Bill_Smith:Denied," to network device 140 when client 110 cannot access any resources on private network 150.

In one implementation, server 130 may send compliance result information to client 110 via compliance result 830. For example, server 130 may inform client 110 that it cannot access portions of private network 150 since client 110 is not running compliant antivirus software. Server 130 may also provide client 110 with remediation information. For example, server 130 may extract information from instructions field 730 (FIG. 7) and may provide the extracted information to client 110 via remediation instructions 840. The extracted information may include software patches to bring client 110 into compliance with the antivirus policy, may include a link to a destination that includes information to bring client 110 into compliance with the antivirus policy, may include text to inform Bill Smith, or another individual, about actions that should be performed to bring client 110 into compliance with the antivirus policy, etc.

Network device 140 may permit or deny access to resources on private network 150 based on policy result information received from server 130. Assume that server 130 determines that client 110 is compliant with an antivirus policy. Further assume that server 130 sends network device 140 a messages such as network access decision 870, indicating that client 110 should be placed on a certain network or portion of a network, such as VLAN 5, or otherwise receive restricted network access, unrestricted network access, or not network access. Network device 140 may receive a request from client 110 to access a resource on private network 150, such as destination 160. Network device 140 may forward the request received from client 110 to destination 160 when client 110 is in compliance with a network policy related to destination device 160. If server 130 determines that client 110 has fallen out of compliance with a network policy related to destination 160, server 130 may send updated enforcement instructions to network device 140. The updated information may tell network device 140 that client 110 is no longer compliant with a network policy related to destination 160. Network device 140 may process the updated network policy information received from server 130 and may terminate a connection between client 110 and one or more resources on private network 150. Network device 140 may grant access to all portions of private network 150, to certain portions of private network 150, to a single device on private network 150, and/or to a file or directory on private network 150.

Alternative implementations of system 100 may be configured with the functionality of server 130, network device 140 and/or SEM 400 implemented in client 110. For example, the functionality of network device 140, with respect to policy enforcement, may be embedded into hardware or software on client 110. Client 110 may be allowed to access a protected resource when server 130 and SEM 400 determine that client 110 complies with one or more network polices. In other alternative implementations, the functionality of server 130 and SEM 400 may be implemented in network device 140. In still other alternative implementations, other configurations of client 110, server 130, network device 140, destination 160 and SEM 400 are possible.

Implementations described herein have been illustrated and discussed with respect to a networked environment. Other implementations may be adapted for use in non-networked environments. For example, a standalone device may have its compliance checked via a SEM operating thereon. The SEM may be configured to evaluate the compliance of the standalone device with respect to hardware or software policies. The SEM may include functionality of server 130 and/or network device 140 when operating in a standalone device. The SEM can be upgraded or reconfigured to accommodate changes in the standalone device, such as the addition of new hardware or new software. Standalone implementations may be adapted for use in appliances, vehicles, aircraft, industrial devices or systems, testing devices, etc., without departing from the spirit of the invention.

CONCLUSION

Implementations consistent with principles of the invention may allow a plug-in module, such as a SEM, to evaluate multiple policies and/or sub-policies on behalf of a host device, such as a server. The SEM may be configured to operate on multiple policies and/or subpolicies at substantially the same time and to provide the host device with policy or sub-policy results. The host device may use the results to implement policies, such as network policies, with respect to an endpoint.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 9, the order of the acts may be modified in other implementations consistent with the principles of the invention. Further, non-dependent acts may be performed in parallel.

For example, implementations consistent with principles of the invention can be implemented using devices and configurations other than those illustrated in the figures and described in the specification without departing from the spirit of the invention. Devices and/or components may be added and/or removed from the implementations of FIGS. 1-4, and 8 depending on specific deployments and/or applications. Further, disclosed implementations may not be limited to any specific combination of hardware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:
1. A device, comprising:
  a processor to:
    identify a plurality of network policies related to a network client device,
    receive, from the network client device, parameter measurements related to the plurality of network policies, determine, based on the parameter measurements, compliance results, where the compliance results identify one or more deficiencies with regard to a compliance, by the network client device, with the plurality of network policies, forward, to a host device, the compliance results, where the compliance results are used by the host device to implement one or more of the plurality of network policies with respect to a network destination device when the network client device attempts to communicate, via the host device, to the network destination device, and forward, to the network client device, remediation instructions, where the remediation instructions are based on the compliance results and include one or more instructions to improve the compliance, of the network client device, with at least one of the plurality of network policies.

2. The device of claim 1, where the processor, when identifying the plurality of network policies, is further to implement an application program interface.

3. The device of claim 1, where the processor, when determining the compliance results, processes the plurality of network policies in parallel.

4. The device of claim 1, where the processor is further to:
produce second compliance results based on other information, where the second compliance results relate to another network device.

5. The device of claim 1, where the processor is further to store data associated with each of the plurality of network policies.

6. The device of claim 1, where the processor is further to:
wait for a particular time period to expire,
after the particular time period expires, receive, from the network client device, additional parameter measurements related to the plurality of network policies,
determine, based on the additional parameter measurements, updated compliance results, and
forward, to a host device, the updated compliance results.

7. A method, comprising:
receiving, by a service device and from a network client device, parameter measurements related to the plurality of network policies,
determining, by the service device and based on the parameter measurements, compliance results, where the compliance results identify one or more deficiencies with regard to compliance, by the network client device, with the plurality of network policies,
forwarding, by the service device and to a host device, the compliance results, where the compliance results are used by the host device to implement one or more of the plurality of network policies with respect to a network destination device when the client device attempts to communicate, via the host device, to the network destination device, and
forwarding, by the service device and to the network client device, remediation instructions, where the remediation instructions are based on the compliance results and include one or more instructions related to the one or more deficiencies.

8. The method of claim 7, where determining the compliance results includes processing the plurality of network policies in parallel.

9. The method of claim 7, further comprising:
producing second compliance results based on other information from another device, where the second compliance policy results relate to the other network device.

10. The method of claim 7, further comprising accessing stored data associated with each of the plurality of network policies.

11. The method of claim 7, further comprising:
waiting for a particular time period to expire,
after the particular time period expires, receiving, from the network client device, additional parameter measurements related to the plurality of network policies,
determining, based on the additional parameter measurements, updated compliance results, and
forwarding, to a host device, the updated compliance results.

12. The method of claim 7, further comprising:
receiving network access information about a network device operating on a first network; and
generating the enforcement instruction for use with the network device and a second network.

13. The method of claim 7, where forwarding the compliance results includes sending network communication policy information to the host device, where the network communication policy information includes at least one of policy identifiers, policy contents, policy names, or links to policy-related information.

14. The method of claim 7, where determining the compliance results includes receiving network policy results from one of a plug-in module or a remote module.

15. The method of claim 7, further comprising:
sending, to the network client device, the compliance results.

16. The method of claim 7, where sending the compliance results to the network client device includes sending an authorization mechanism to enable the network client device to access the network destination device.

17. The method of claim 7, where forwarding the compliance results to a host device, includes sending enforcement instruction that defines access, by the network client device, to the network destination device.

18. A computer readable memory device that stores instructions executable by a processing device, the computer readable memory device comprising:
instructions to receive network communication policy information;
instructions to retrieve a plurality of network policies based on the network communication policy information;
instructions to determine whether a network device complies with the plurality of network policies;
instructions to produce policy results based on determining whether the network device complies with the plurality of network policies; and
instructions to forward remediation instructions to the network device, where the remediation instructions are based on the policy results and identify one or more actions to improve compliance, by the network device, with one or more of the plurality of network policies.

19. The computer readable memory device of claim 18 further comprising:
instructions to send the policy results to a policy decision point that is to implement at least a subset of the network policies on behalf of a destination.

20. The computer readable memory device of claim 19 further comprising:
Instruction to send an authorization mechanism to the network device, where the authorization mechanism enables the network device to access, via the policy decision point, data stored at the destination.

* * * * *